US010087784B2

(12) United States Patent
Shapiro et al.

(10) Patent No.: US 10,087,784 B2
(45) Date of Patent: Oct. 2, 2018

(54) INTEGRAL SEGMENTED CMC SHROUD HANGER AND RETAINER SYSTEM (71) Applicant: General Electric Company, Schenectady, NY (US)

(72) Inventors: Jason David Shapiro, Lynn, MA (US); Jonathan David Baldiga, Lynn, MA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 468 days.

(21) Appl. No.: 14/770,411

(22) PCT Filed: Feb. 21, 2014

(86) PCT No.: PCT/US2014/017569
§ 371 (c)(1),
(2) Date: Aug. 25, 2015

(87) PCT Pub. No.: WO2014/130762
PCT Pub. Date: Aug. 28, 2014

(65) Prior Publication Data
US 2016/0003103 A1    Jan. 7, 2016

Related U.S. Application Data (60) Provisional application No. 61/768,866, filed on Feb. 25, 2013.

(51) Int. Cl.
*F01D 25/24* (2006.01)
*F01D 25/00* (2006.01)

(52) U.S. Cl.
CPC ......... *F01D 25/246* (2013.01); *F01D 25/005* (2013.01); *F05D 2300/6033* (2013.01); *Y02T 50/672* (2013.01)

(58) Field of Classification Search
CPC .... F01D 25/005; F01D 25/246; F01D 11/005; F05D 2300/6033; Y02T 50/672
(Continued)

(56) References Cited

U.S. PATENT DOCUMENTS

| 5,320,487 A | 6/1994 | Walker et al. |
| 5,593,278 A | 1/1997 | Jourdain et al. |

(Continued)

FOREIGN PATENT DOCUMENTS

| CN | 101372902 A | 2/2009 |
| GB | 2117843 A | 10/1983 |

(Continued)

OTHER PUBLICATIONS

Unofficial English Translation of Chinese Office Action issued in connection with corresponding CN Application No. 201480010329.4 dated Feb. 2, 2016.

(Continued)

*Primary Examiner* — Mark Laurenzi
*Assistant Examiner* — Paul Thiede
(74) *Attorney, Agent, or Firm* — General Electric Company; William Andes (57) ABSTRACT

A shroud hanger with integral retainer assembly comprises a ceramic matrix composite shroud hanger a first wall and a second wall, the hanger having a support wall extending between the first and second walls, the support wall having a shoulder near circumferential ends, a retainer depending from the support wall having a first lower leg and a second lower leg extending in the circumferential direction, a first shroud supported by the first lower leg and a second shroud supported by the second lower leg.

10 Claims, 5 Drawing Sheets

(58) Field of Classification Search
USPC .............................................. 415/173.1, 200
See application file for complete search history.

(56) References Cited

U.S. PATENT DOCUMENTS

| | | | |
|---|---|---|---|
| 7,749,565 B2 | 7/2010 | Johnson et al. | |
| 8,047,773 B2 | 11/2011 | Bruce et al. | |
| 2005/0271505 A1 | 12/2005 | Alford et al. | |
| 2008/0206046 A1* | 8/2008 | Razzell | F01D 11/005 |
| | | | 415/173.1 |
| 2013/0004306 A1* | 1/2013 | Albers | F01D 25/246 |
| | | | 415/200 |

FOREIGN PATENT DOCUMENTS

| | | |
|---|---|---|
| JP | S62-174502 A | 7/1987 |
| JP | 2003-293704 A | 10/2003 |
| JP | 2004-211697 A | 7/2004 |
| JP | 2005-351265 A | 12/2005 |

OTHER PUBLICATIONS

A PCT Search Report and Written Opinion issued in connection with corresponding PCT Application No. PCT/US2014/017569 dated Jul. 1, 2014.

Intention to Grant issued in connection with corresponding EP Application No. 147090831 dated Oct. 10, 2016.

Machine Translation and Notification of Reasons for Refusal issued in connection with corresponding JP Application No. 2015-558980 dated Dec. 26, 2017.

Baldiga, J. D., et al., Cmc shroud support system, GE co-pending U.S. Appl. No. 61/824,491, filed May 17, 2013.

* cited by examiner

INTEGRAL SEGMENTED CMC SHROUD HANGER AND RETAINER SYSTEM

CROSS-REFERENCE TO RELATED APPLICATIONS

This application is a PCT utility patent application claiming priority to and benefit from currently U.S. Provisional Patent Application Ser. No. 61/768,866, filed Feb. 25, 2013, and titled "Integral Segmented CMC Shroud Hanger and Retainer System".

BACKGROUND

The disclosed embodiments generally pertain to gas turbine engines. More particularly, but not by way of limitation, present embodiments relate to shrouds utilized in gas turbine engines.

A typical gas turbine engine generally possesses a forward end and an aft end with its several core or propulsion components positioned axially there between. An air inlet or intake is located at a forward end of the engine. Moving toward the aft end, in order, the intake is followed by a compressor, a combustion chamber, and a turbine. It will be readily apparent from those skilled in the art that additional components may also be included in the engine, such as, for example, low-pressure and high-pressure compressors, and low-pressure and high-pressure turbines. This, however, is not an exhaustive list. An engine also typically has an internal shaft axially disposed along a center longitudinal axis of the engine. The internal shaft is connected to both the turbine and the air compressor, such that the turbine provides a rotational input to the air compressor to drive the compressor blades.

In operation, air is pressurized in a compressor and mixed with fuel in a combustor for generating hot combustion gases which flow downstream through turbine stages. These turbine stages extract energy from the combustion gases. A high pressure turbine first receives the hot combustion gases from the combustor and includes a stator nozzle assembly directing the combustion gases downstream through a row of high pressure turbine rotor blades extending radially outwardly from a supporting rotor disk. In a two stage turbine, a second stage stator nozzle assembly is positioned downstream of the first stage blades followed in turn by a row of second stage rotor blades extending radially outwardly from a second supporting rotor disk. The turbine converts the combustion gas energy to mechanical energy.

Each of the turbines may include one or more stages of rotor blades which extend radially outward from rotor discs. A shroud assembly circumscribes the turbine rotor and defines an outer boundary for combustion gases flowing through the turbine. The turbine shroud may be a single unitary structure or may be formed of a plurality of segments.

Some known shroud assemblies include a shroud hanger that is coupled to an outer casing of the engine to provide support to a plurality of shrouds positioned adjacent to, and radially outward of, the tips of the turbine blades. It is desirable to limit the clearance between the shroud and the blade tips to limit loss of energy from the combustion gas flowing there through.

The shroud must be capable of meeting the design life requirements for use in the turbine engine operating temperature and pressure environment. To enable current materials to operate effectively in such strenuous temperature and pressure conditions, it has been practiced to utilize composite and, in particular, ceramic matrix composite (CMC) materials for use in the shroud segments because they have higher temperature capability than metallic type parts. However, such ceramic matrix composite (CMC) have mechanical properties that must be considered during the design and application of the CMC use as a shroud segment or component. CMC materials have relatively low tensile ductility or low strain to failure when compared to metallic materials. Also, CMC materials have a coefficient of thermal expansion which differs significantly from metal alloys used as restraining supports or hangers for shrouds of CMC type materials. Therefore, if a CMC shroud segment is restrained and cooled on one surface during operation, forces can develop leading to failure of the segment.

As may be seen by the foregoing, it would be desirable to overcome these and other deficiencies with gas turbine engines components.

SUMMARY

According to present embodiments, a shroud hanger with integral retainer assembly includes a ceramic matrix composite shroud hanger, which extends in an axial direction and a circumferential direction, a support wall extends in a circumferential direction, the support wall having a shoulder near ends, a retainer depending from the support wall having a first lower leg and a second lower leg extending in circumferential directions, a first shroud supported by the a first lower leg and a second shroud supported by the second lower leg.

Optionally, the ends of the shrouds are offset from the ends of the shroud hanger. The retainer may be substantially T-shaped. The hanger may have a forward wall and an aft wall. The retainer may have a first depending member and optionally may have a second depending member spaced from the first depending member. The lower legs may have a circumferential length less than the first and second arms. The legs are disposed into the shrouds at slash faces of the shrouds. The legs having pads near ends of the retainer. The pads and the shoulders may capture the shrouds. The legs having pads that support the shrouds at first circumferential locations. The shoulders restraining the shroud at a second circumferential location. The shoulders depending downwardly and the pads extending upwardly. The hanger retaining the shrouds in a radial direction and a circumferential direction.

All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

Embodiments of the invention are illustrated in the following illustrations.

DETAILED DESCRIPTION

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring to FIGS. 1-7 various embodiments of an integral segmented CMC shroud hanger and retainer system are depicted. The shroud hanger and retainer system may be utilized in various portions of the gas turbine engine including, but not limited to, high pressure and low pressure turbines as well as the compressor. The embodiments utilize a hanger which is integrally formed with the retainer for support of shroud segments. Each hanger supports two segments and in this configuration the end or split lines of the shroud hanger are offset from the end or slash faces of the shrouds. The instant configurations reduce part complexity by combining the hanger and the retainer and likewise reduce weight. All of these features improve manufacture.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

Figure 1:
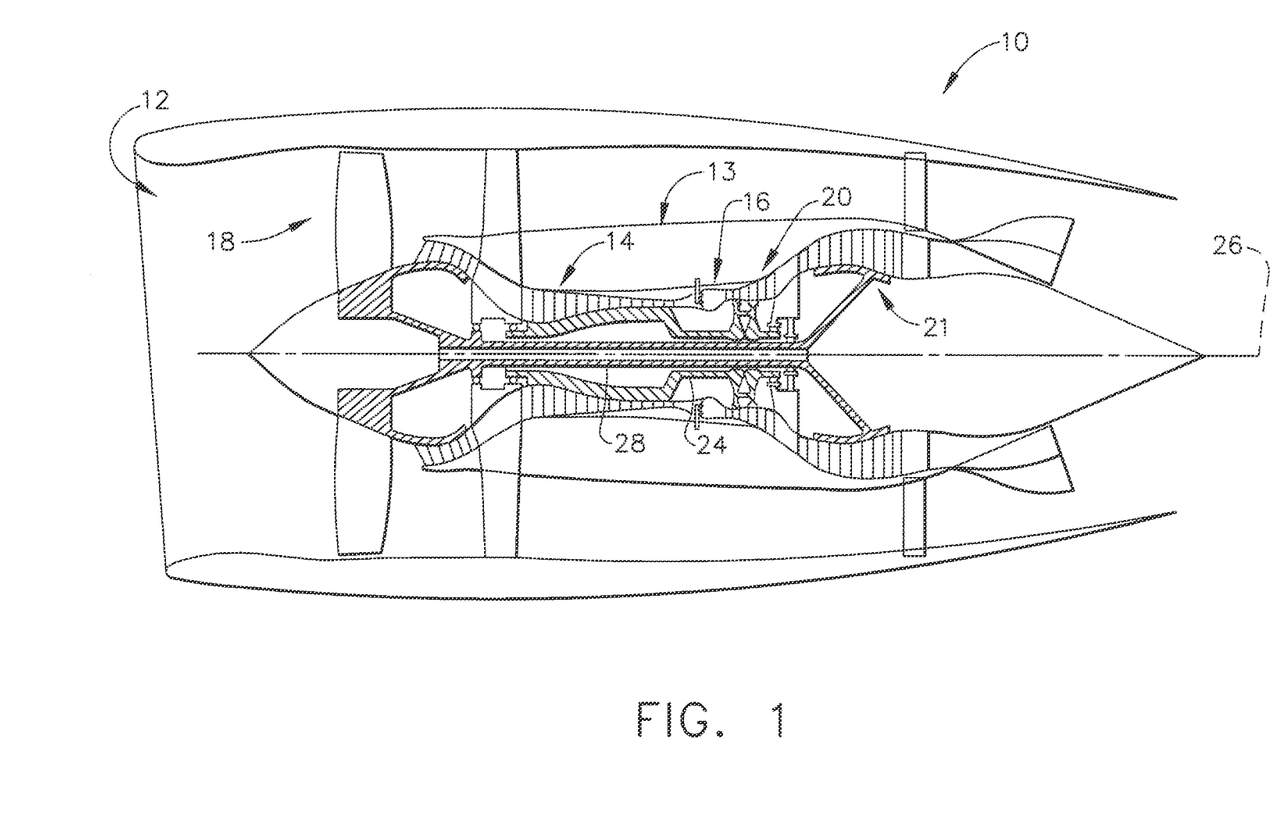
FIG. 1 is a side section view of a gas turbine engine.

Referring initially to FIG. 1, a schematic side section view of a gas turbine engine 10 is shown. The function of the turbine is to extract energy from high pressure and temperature combustion gases and convert the energy into mechanical energy for work. The turbine 10 has an engine inlet end 12 wherein air enters the core or propulsor 13 which is defined generally by a compressor 14, a combustor 16 and a multi-stage high pressure turbine 20. Collectively, the propulsor 13 provides thrust or power during operation. The gas turbine 10 may be used for aviation, power generation, industrial, marine or the like.

In operation air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design. The turbofan 18 is connected by the shaft 28 to a low pressure turbine 21 and creates thrust for the turbine engine 10. A low pressure turbine 21 may also be utilized to extract further energy and power additional compressor stages. The low pressure air may be used to aid in cooling components of the engine as well.

Figure 2:
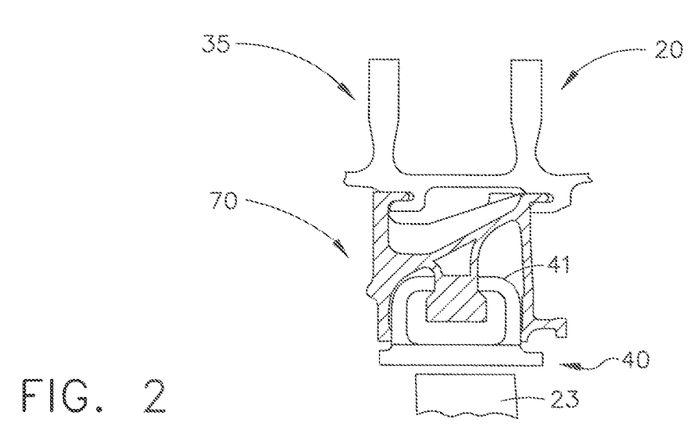
FIG. 2 is a side view of an exemplary turbine shroud section including a shroud hanger and retainer assembly.

With reference additionally to FIG. 2, an exemplary turbine shroud section is depicted. The turbine 20 includes a row of circumferentially spaced stationary vanes and a plurality of circumferentially spaced turbine blades downstream of the vanes. The blades 23 are foil-shaped and mounted to a turbine rotor disk. Each of the blades 23 extends radially toward a shroud 40. The shroud 40 extends circumferentially about the engine axis 26 and is comprised of a plurality of shroud segments 41. Optionally, the shroud 40 may be formed of one unitary structure. The shroud 40 is tightly configured relative to the blades 23 to define an outer radial flowpath boundary for the hot combustion gas flowing through the turbine 20.

The gas turbine 10 is axi-symmetrical about engine axis 26 or shaft 24 so that various engine components rotate thereabout. The axis-symmetrical shaft 24 extends through the turbine engine forward end into an aft end and is journaled by bearings along the length of the shaft structure to rotate about the centerline 26. The shaft 24 may be hollow to allow rotation of a low pressure turbine shaft 28 therein and independent of the shaft 24 rotation. Shaft 28 also may rotate about the centerline axis 26 of the engine. During operation, the shaft 28 rotates along with other structures connected to the shaft such as the rotor assemblies of the turbine in order to create power or thrust for various types of turbines used in power and industrial or aviation areas of use.

Referring again to FIG. 2, a side section view of the turbine 20 is depicted. An engine casing 35 extends circumferentially about the engine axis 26 (FIG. 1). Hangers 70 are extending from the radially inward side of the engine casing 35. The hangers 70 retain the shroud segments 41 in circular configuration about the engine axis 26 and define the flow boundary within the turbine 20.

Figure 3:
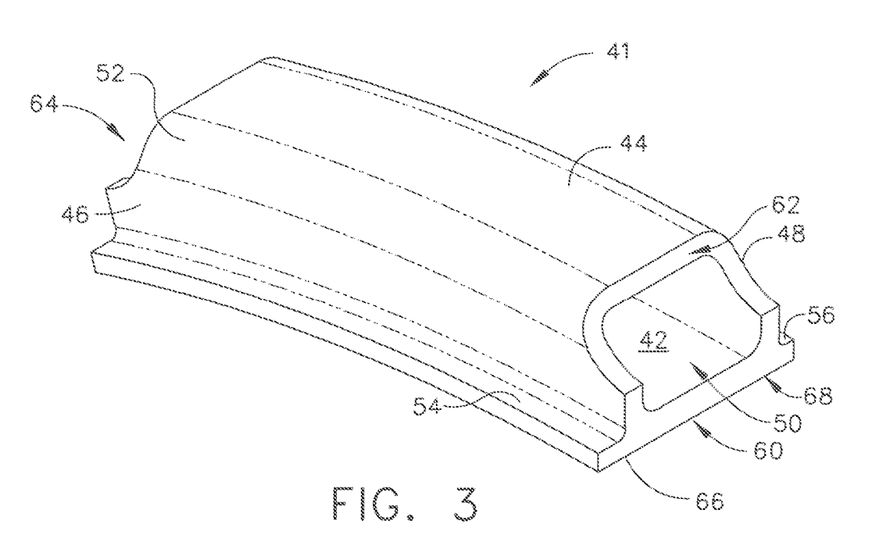
FIG. 3 is an isometric view of a shroud segment disposed in a turbine section.

Referring now to FIG. 3, an isometric view of an exemplary shroud segment 41 is depicted. Each shroud segment 41 has a generally hollow cross sectional shape defined by a radially inner wall 42 and a radially outer wall 44 and forward and aft walls 46, 48. Various cross-sectional shapes may be defined and the depicted shape should not be considered limiting. The walls 42, 44, 46, 48 define a hollow interior or cavity 50 through which air may pass for cooling of the shroud segments 41. A transition wall 52 may also be located between the forward wall 46 and the radially outer wall 44. The transition wall 52 may be curved as shown or at an acute angle relative to the longitudinal axis 26 of the engine 10. The walls 42, 44, 46, 48, 52 may be joined by radiused, sharp or squared-edged transitions between the intersections of the walls. As shown herein, the walls are generally radiused which may improve manufacture of the part.

The radially inner wall 42 extends beyond the forward wall 46 and aft wall 48 to define forward and aft overhangs 54, 56. When a plurality of shroud segments 40 is positioned together, a substantially continuous flow surface 60 is defined along the radially inner side of wall 42. This is best seen in a forward looking aft view of FIG. 5.

The shroud segments 40 include end faces 68 which are commonly referred to as "slash faces." The slash faces 68 may lie in plane parallel to the center line axis of the engine 10, referred to as a "radial plane", or they may be slightly offset from the radial plane, or otherwise oriented so that they are at an acute angle to such radial plane. Along the slash faces are relief sections 62, 64, which in combination with adjacent relief sections of adjacent segments 41 form apertures. When a plurality of segments 41 are positioned to form a shroud or shroud assembly 40, the shroud 40 has a plurality of circumferentially spaced apertures formed by adjacent relief sections 62, 64 located at the slash faces 68. The shroud 40 is supported from the engine casing 35 (FIG. 2) at these locations.

When the segments 41 are assembled into a complete ring, end gaps may be present between the faces 68 at the adjacent shroud segments 41. One or more seals may be provided at the end faces 68. These seals are generally known as "spline" seals formed of thin strips of metal or other suitable materials which are inserted in slots in the end faces to span the gaps between adjacent segments 40.

The shroud segments 41 may be constructed of various low ductility and low coefficient of thermal expansion materials including but not limited to a ceramic matrix composite (CMC). Generally, CMC materials include a ceramic fiber, for example a silicon carbide (SiC), forms of which are coated with a compliant material such as boron nitride (BN). The fibers are coated in a ceramic type matrix, one form of which is silicon carbide (SiC). Typically, the shroud segment 40 can also be constructed of other low-ductility, high-temperature-capable materials. CMC materials generally have room temperature tensile ductility of less than or equal to about 1% which is used herein to define a low tensile ductility material. Generally, CMC materials have a room temperature tensile ductility in the range of about 0.4% to about 0.7%.

CMC materials have a characteristic wherein the materials tensile strength in the direction parallel to the length of the fibers (the "fiber direction") is stronger than the tensile strength in the direction perpendicular. This perpendicular direction may include matrix, interlaminar, secondary or tertiary fiber directions. Various physical properties may also differ between the fiber and the matrix directions.

Flow path 60 of the shroud segment may incorporate a layer of environmental barrier coating 66, which may be an abradable material, and/or a rub-tolerant material of a known type suitable for use with CMC materials. This layer is sometimes referred to as a "rub coat" 66. As used herein, the term "abradable" implies that the rub coat 66 is capable of being abraded, ground, or eroded away during contact with the tips of the turbine blades 23 as they turn inside the shroud segments 41 at high speed, with little or no resulting damage to the turbine blade tips. This abradable property may be a result of the material composition of the rub coat 66, by its physical configuration or by some combination thereof. The rub coat 66 may comprise a ceramic layer such as yttria stabilized zirconia or barium strontium aluminosilicate.

Exemplary compositions and methods suitable for making the rub 38 are described in U.S. Pat. No. 7,749,565 (Johnson, et al.), which is incorporated herein by reference.

Figure 4:
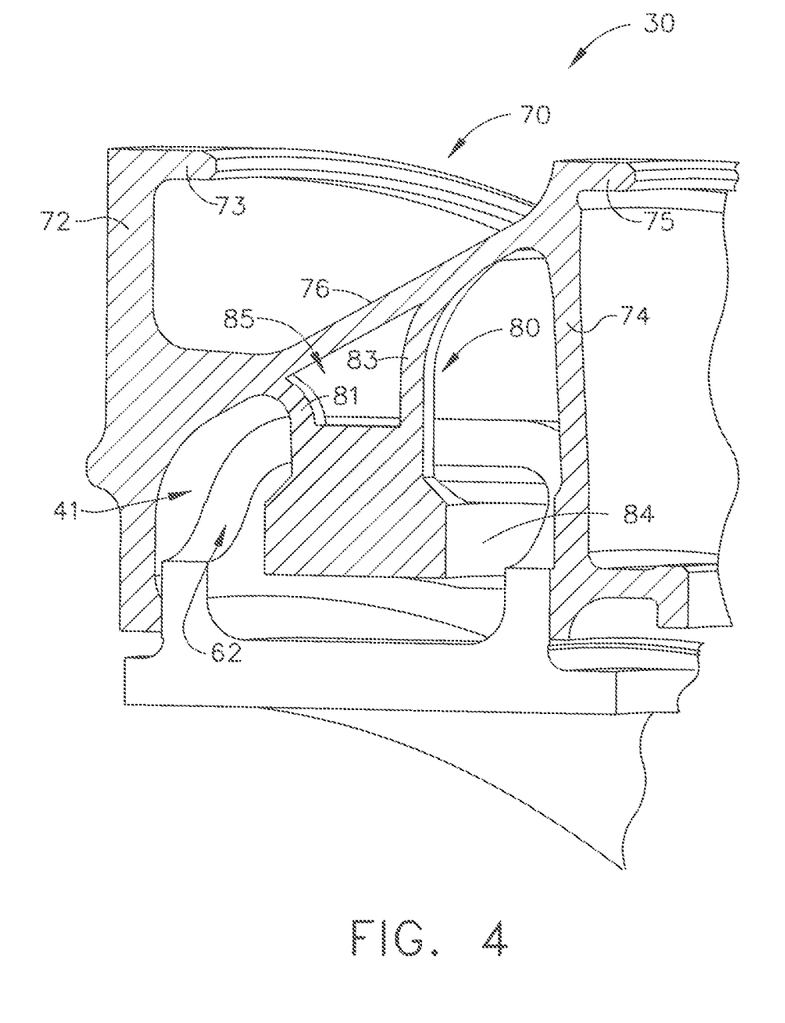
FIG. 4 is an isometric section view of the hanger and shroud assembly in a turbine section.

Referring now to FIG. 4 is a section view of the hanger with integral retainer assembly 30. The hanger 70 includes a first wall 72 and a second wall 74 aft of said first wall. At radially outer ends, the hangers include tabs 73, 75 for connection of the hanger 70 to the engine casing 35 (FIG. 2). Extending between the first wall 72 and the second wall 74 is a retainer support wall 76. According to one embodiment, the wall 76 is tapered from a lower radial height at the first wall 72 to a higher radial height at the second wall 74.

A retainer 80 depends from the retainer support wall 76. The retainer 80 is formed of a first member 81 and a second member 83. A hollow opening 85 is formed between the wall 76, the members 81, 83 and legs 82, 84. Alternatively, the hollow area 85 may be filled in with material, for example in applications where weight is not a concern. The legs 82, 84 are positioned though the openings defined by adjacent relief sections 62, 64.

Figure 5:
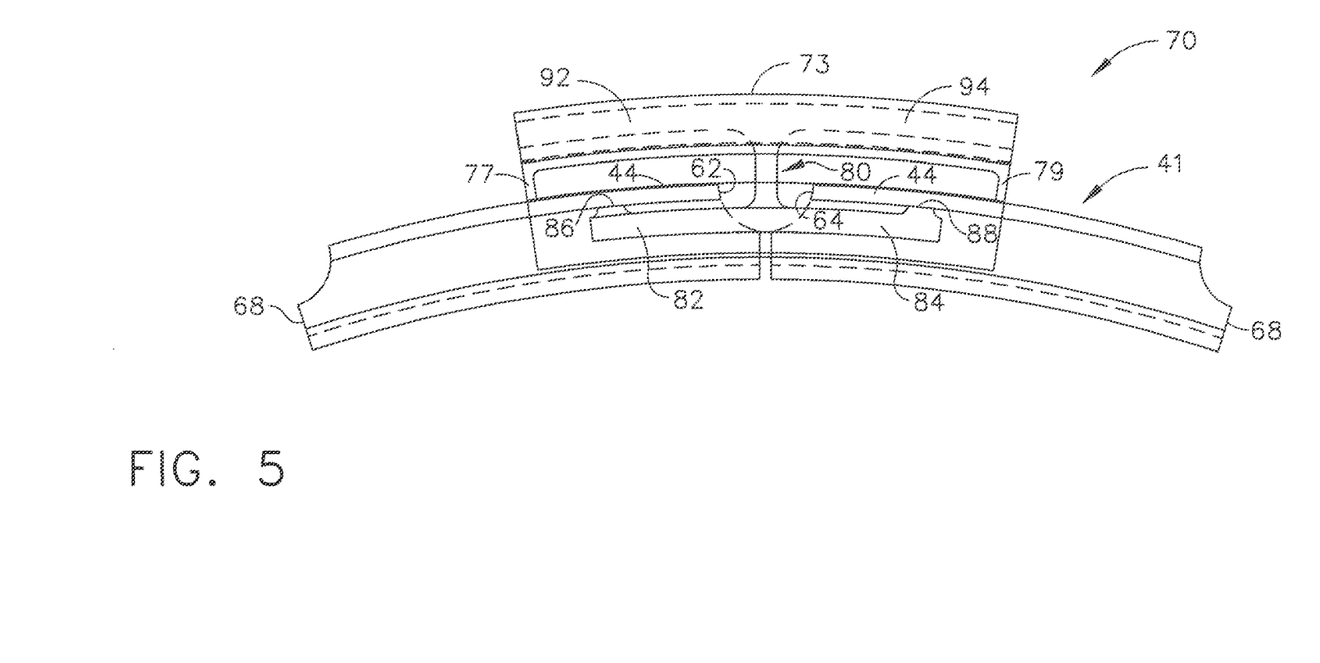
FIG. 5 is an forward-looking-aft view of an integral hanger and retainer assembly with shroud segments; and, FIG. 6 is an isometric view of the hanger and retainer assembly is depicted.

Referring now to FIG. 5, a forward looking aft view of a hanger 70 is depicted with two adjacent shroud segments 41 being supported. The hanger 70 is formed so that ends of the hanger 70 are offset from ends or slash faces 68 of the shroud segments 41. The hanger 70 has an upper tabs 73, 75 which extends in a circumferential direction and in a depth-wise axial direction as viewed in the instant figure. The retainer support wall 76 extends circumferentially to define first and second arms 92, 94. The arms 92, 94 terminate at opposed shoulders 77, 79. The shoulders 77, 79 fall centrally along the circumferential length of adjacent shroud segments 41.

The hanger 70 further comprises a retainer body 80 depending downwardly from the first and second arms 92, 94. The retainer body 80 has legs 82, 84 extending from the lower end of the body 80. Near ends of legs 82, 84 are pads 86, 88. Each of the legs 82, 84 may comprise one or more of these pads. The legs 82, 84 are positioned through the reliefs 62, 64 of the adjacent shrouds 40 so that the pads 86, 88 engage the under surface of the radially outer wall 44. The shoulders 77, 79 engage the upper surface of the radially outer wall 44 so that the shroud segments 40 are captured between the pads and the shoulders of the hanger 70. In this configuration, the radial movement of the segments 41 is limited. The first and second walls 72, 74 of the hanger 70 inhibit axial movement of the shroud 40.

The hanger 70 and retainer 80 are integrally formed and may also be constructed of various low ductility and low coefficient of thermal expansion materials including but not limited to ceramic matrix composite (CMC), for example. Generally, CMC materials include a ceramic fiber, for example a silicon carbide (SiC), forms of which are coated with a compliant material such as boron nitride (BN). The fibers are coated in a ceramic type matrix, one form of which is silicon carbide (SiC). CMC materials have a characteristic wherein the materials tensile strength in the direction parallel to the length of the fibers (the "fiber direction") is stronger than the tensile strength in the direction perpendicular. This perpendicular direction may include matrix, interlaminar, secondary or tertiary fiber directions. Typically, the hanger 70 and retainer 80 can be constructed of other low-ductility, high-temperature-capable materials. This construction reduces weight as opposed to metallic hangers and retainers and are heavier and may not perform as well in the high heat, high pressure environment of the turbine section.

Figure 6:
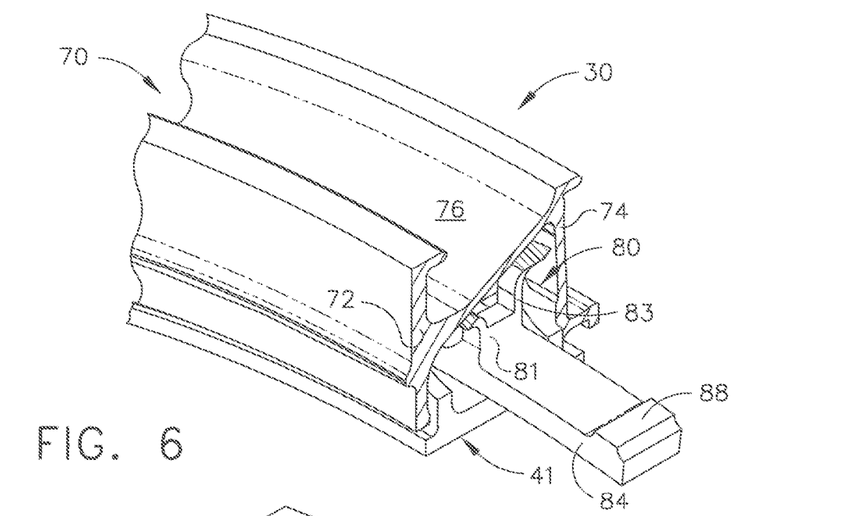
Figure 7:
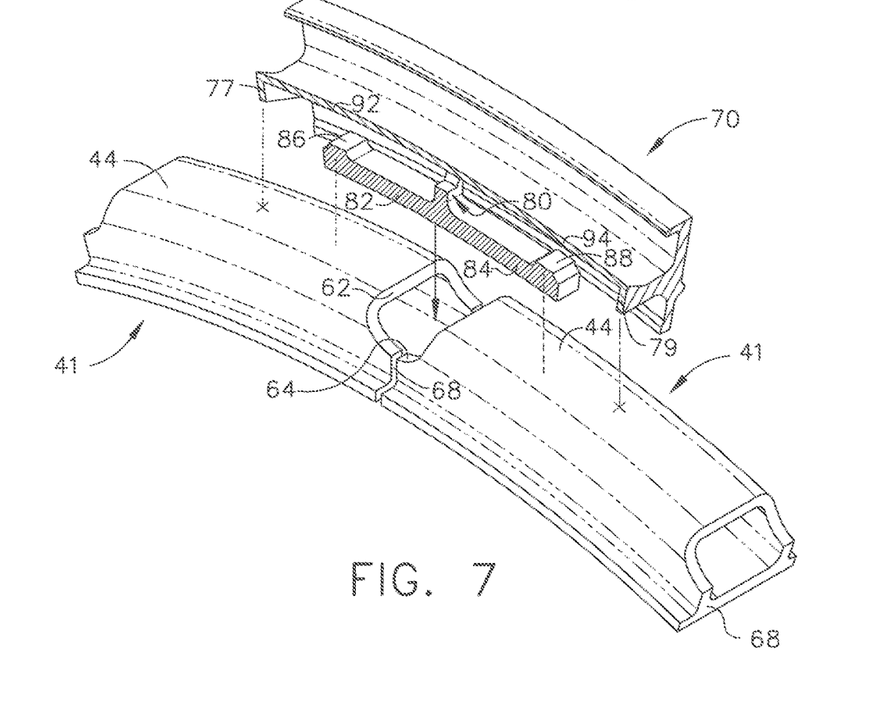
FIG. 7 is an exploded isometric view of the assembly of FIG. 6.

Referring now to FIGS. 6 and 7, isometric views of the assembly 30 and the exploded assembly are shown. The hanger 70 is depicted having the integral retainer 80. The retainer 80 is positioned through the apertures defined at slash faces 68 by the relief sections 62, 64. As shown in FIG. 6, one side of the retainer 80 is retaining the shroud segment 41. The second shroud segment to the right hand side of the depicted shroud segment 41 is removed to show the other half of the retainer 80.

As shown in FIG. 7, the retainer 80 includes the legs 82, 84 depending therefrom and which extend in a generally circumferential direction. Each of the legs includes a pad 86, 88 to engage in undersurface of the top wall 44 of each shroud segment 41. The upper anus 92, 94 define the retainer support wall 76 and include shoulders 77, 79. These shoulders 77, 79 may engage the top surface of the shroud outer walls 44. As previously described, the first and second walls 72, 74 of the hanger 70 surround the outer portion of the shroud segments 41 to limit movement in the engine axial direction. The circumferential arrangement of the shroud segments 41 inhibit circumferential movement of the individual segments relative to one another. Finally, the retainer legs 82, 84 and the integral arms 92, 94 inhibit radial movement of the shroud segments 41 toward the turbine blades 23 (FIG. 2).

The foregoing description of structures and methods has been presented for purposes of illustration. It is not intended to be exhaustive or to limit the structures and methods to the precise forms and/or steps disclosed, and obviously many modifications and variations are possible in light of the above teaching. Features described herein may be combined in any combination. Steps of a method described herein may be performed in any sequence that is physically possible. It is understood that while certain forms of composite structures have been illustrated and described, it is not limited thereto and instead will only be limited by the claims, appended hereto.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An apparatus for supporting turbine shroud segments, comprising:
    a ceramic matrix composite shroud hanger including: a first wall, a second wall, and a support wall extending between said first wall and said second wall, said support wall including a first shoulder near a first circumferential end of the shroud hanger and a second shoulder near a second circumferential end of the shroud hanger;
    a ceramic matrix composite retainer depending from said support wall and comprising a first leg and a second leg, wherein the first leg extends toward the first circumferential end and the second leg extends toward the second circumferential end;
    a first shroud segment including a radially outer wall having an under surface and an opposed upper surface, wherein said first leg engages said under surface of said radially outer wall of said first shroud segment and said first shoulder engages said upper surface of said radially outer wall of said first shroud segment; and
    a second shroud segment including a radially outer wall having an under surface and opposed upper surface, wherein said second leg engages said under surface of said radially outer wall of said second shroud segment and said second shoulder engages said upper surface of said radially outer wall of said second shroud segment.

2. The apparatus of claim 1, wherein circumferential ends of said shrouds are offset from said first and second circumferential ends of said shroud hanger.

3. The apparatus of claim 1, wherein said retainer is substantially T-shaped.

4. The apparatus of claim 1, wherein one of said first wall and said second wall is a forward wall and the other of said first wall and said second wall is an aft wall.

5. The apparatus of claim 1, wherein said retainer further comprises a first depending member interconnecting said support wall and said first and second legs.

6. The apparatus of claim 5, wherein said retainer further comprises a second depending member spaced from said first depending member.

7. The apparatus of claim 1, wherein said support wall defines a first arm and a second arm extending circumferentially.

8. The apparatus of claim 7, wherein said first leg and said second leg have a circumferential length less than a circumferential length of said first arm and said second arm.

9. The apparatus of claim 1, wherein said legs are disposed into said shrouds at slash faces of said shrouds.

10. The apparatus of claim 1, wherein each of said legs includes a pad which engages the respective under surface.

\* \* \* \* \*